United States Patent [19]
Douthitt

[11] 3,788,047
[45] Jan. 29, 1974

[54] APPARATUS FOR SORPTION OF GAS

[75] Inventor: Merton H. Douthitt, Shaker Hts., Ohio

[73] Assignee: SCM Corporation, Cleveland, Ohio

[22] Filed: Nov. 4, 1971

[21] Appl. No.: 195,703

[52] U.S. Cl. .............................. 55/387, 137/525.1
[51] Int. Cl. ...................... B01d 53/02, F16k 21/04
[58] Field of Search... 55/163, 387, 74, 58, 62, 388, 55/389; 137/103, 525.1, 527, 527.2; 220/DIG. 19, 44 R, 44 B; 62/48, 54

[56] References Cited
UNITED STATES PATENTS

| | | | |
|---|---|---|---|
| 3,186,150 | 6/1965 | Zankey | 55/387 |
| 3,279,151 | 10/1966 | Kauer et al. | 55/163 |
| 3,399,510 | 9/1968 | Kauer et al. | 55/163 |
| 2,986,098 | 5/1961 | Trout et al. | 137/525.1 |
| 3,075,547 | 1/1963 | Scaramucci | 137/527.2 |
| 3,572,375 | 3/1971 | Rosenberg | 137/525.1 |

Primary Examiner—Charles N. Hart
Attorney, Agent, or Firm—Merton H. Douthitt; S. I. Khayat

[57] ABSTRACT

An improved apparatus containing activated carbon for the sorption of impurities from vapor-laden feed gas and a unitary fitting adapted for such apparatus are set forth. The improvement in the carbon sorber apparatus comprises a pair of check valves, the first disposed for permitting undirectional flow of laden feed gas from a supply line under superambient pressure into the inlet of a carbon sorber unit, and therein into contact with the bed of activated carbon sorbent, then out of said unit to ambient atmosphere as stripped exit gas, the second check valve disposed for supplying, in bypass of the carbon sorber unit and the first check valve, undirectional flow of ambient atmosphere into said supply line as subambient pressure occurs therein. The unitary fitting houses both said check valves disposed in proper interacting relationship for convenient, accurate, and compact installation of the apparatus.

4 Claims, 4 Drawing Figures

APPARATUS FOR SORPTION OF GAS

Removal of sorbable vapors from a vapor-laden gas in contacting apparatus wherein such gas is contacted with a bed of activated carbon particles is widely practiced. Typically in such apparatus, the laden gas is forced through a carbon bed confined in a container, usually a static bed, then exhausted therefrom to atmosphere as stripped exit gas until the carbon loses its absorbing capacity.

When such sorbing apparatus is installed on a line providing intermittent outflows of such laden gas coupled with inflows of ambient atmosphere (as customarily occurs in the vent line of an atmospheric tank containing volatile solvent, which tank is pumped into and out of periodically and subjected to temperature variation), the outside air entering during an ambient atmosphere inflow period necessarily contacts the carbon. If such air has sorbable materials in it, these can be picked up by the carbon and the capacity of the carbon thereby reduced for doing the job it is installed for; namely, preventing contamination of the atmosphere with tank vapors. Naturally, if the breathing in of ambient atmosphere to such tank is substantially restricted, the tank is in danger of collapsing.

The instant invention provides for such carbon sorption of vapors form an intermittent gas feed so that outflows of such gas feed are always treated by the carbon bed, but that such carbon treatment is bypassed when such gas ouflow ceases and an actual inflow of ambient atmosphere is entering the gas supply vessel. Thus, treatment of the ambient atmosphere is precluded without possible uncontrolled attendant losses in efficiency and capacity of the carbon sorber while at the same time, equilibrating pressure is provided to keep from collapsing the tank or other gas supply vessel.

In one aspect, the invention is an activated carbon sorber wherein vapor-laden feed gas is passed intermittently from a feed conduit through an inlet of carbon sorber into contact with a bed of activated carbon, and then from an outlet to ambient atmosphere as stripped exit gas. The improved apparatus selectively provides for vapor-laden feed gas treatment and precludes substantial subambient pressure development in the feed conduit and comprises: a pair of check valves, the first disposed for permitting said laden feed gas to contact said carbon bed and to discharge to said atmosphere as stripped exit gas without permitting substantial gas flow in the opposite direction, the second disposed for supplying in bypass of the carbon bed and the first check valve ambient atmosphere into the feed conduit without permitting substantial gas flow in the opposite direction.

In another aspect, the invention is a unitary fitting for a feed line through which vapor-laden feed gas is supplied intermittently to an activated carbon sorber. The fitting comprises: a housing having at least three gas ports, the first port being an inlet for vapor-laden gas and having means for connecting it to said feed line, a second port being an exit to the sorber and having means for connecting it to the inlet of the sorber, and a third port being an inlet for atmospheric air; a gas passageway connecting the first port to both the second and the third ports; a first check valve in the housing disposed for discharging vapor-laden gas through the second port; a second check valve in said housing disposed for accepting atmospheric air from the third port.

As used in describing the apparatus of this invention, a "check valve" is meant to refer to those valves permitting flow of fluid; e.g., gas or liquid, in one way only. If the direction of flow in a conduit line is changed from the permitting direction, the valve closes sealing the conduit line and preventing flow therethrough. Any check valve having one-way flow characteristics can be used in practicing this invention. Commonly used check valves are the swing, lift, and ball check valves. Examples of the swing check valve are the composition disc and regrinding swing check. The flapper in a swing check valve can be pivotably mounted or cantilevered in the valve housing. In both types, the flapper closes against a seat to seal the conduit. Examples of lift check valves are the composition disc and spring-loaded steel disc. Another type of check valve is a reed type valve, such valve having at least one reed-like member which bends to open a flow path in response to pressure from one side, but seals off flow in response to pressure from the other.

The check valves used in the apparatus or disposed in the unitary fitting should be lightly loaded so that they are readily activated and fluid can flow through the valve when the pressure differential is only a few inches of water. Thus, if the check valves are spring-loaded or cantilevered, they should activate under slight pressure.

Figure 1:
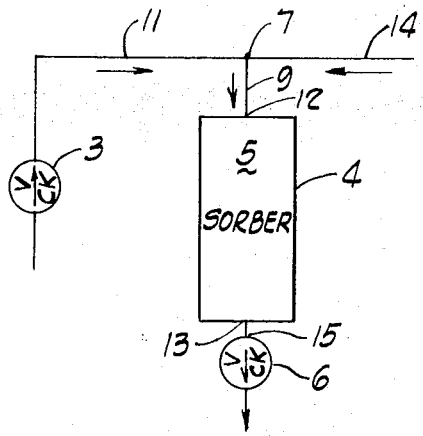
FIG. 1 is a schematic illustration of an embodiment of the invention showing an activated carbon sorber unit and the location of the first check valve for preventing flow of feed gas to said atmosphere.

Referring to FIG. 1, carbon sorber unit 4 is adapted for holding activated carbon as a carbon bed 5 through which laden feed gas is passed. Carbon sorber unit 4 has an inlet 12 and an outlet 13. Feed conduit lines 9 and 14 meet at tee 7 with line 14 communicating with the inlet of the sorber for introduction of laden feed gas to carbon bed 5 and contact therewith for stripping of laden materials. Exit conduit line 15 communicates with outlet 13 and is open to the atmosphere so that the stripped gas can be vented from the sorber unit. A first check valve 6 is disposed in conduit 15 at a point below outlet 13 so that the flow of gas can pass in a direction from the inlet 12 of the carbon sorber unit through the carbon bed 5 and out outlet 13 as indicated by the arrow, while preventing flow of atmospheric air to the carbon sorber unit. There is additionally disposed, an atmospheric conduit line 11 communicating with tee 7 and therefrom with feedlines 9 and 14. A second check valve 3 is disposed in this atmospheric conduit line 11 so that the ambient atmosphere air can flow through this conduit line and to feed lines 9 and 14 as subambient pressure develops on the inlet side of the carbon sorber unit. Usually bleed-in of air through line 11 in sufficient to bring the pressure in the sorber unit to atmospheric pressure.

Figure 2:
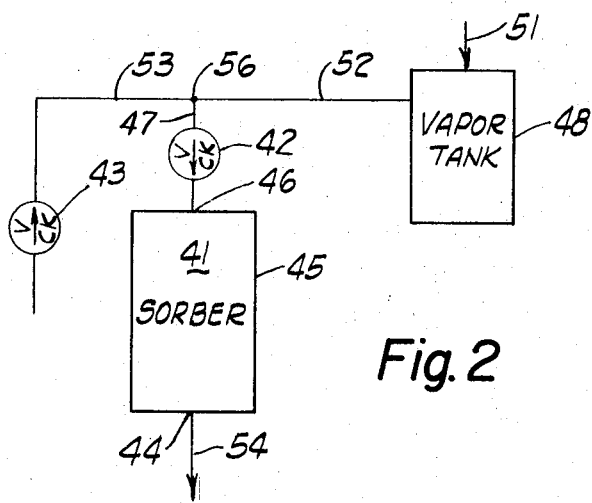
FIG. 2 is a schematic illustration of a second embodiment of the invention illustrating a vapor tank in combination with a sorber and the locations of their respective check valves.

FIG. 2 is a schematic of another embodiment of a carbon sorber unit in combination with a vapor tank. In the instant apparatus, laden feed gas is passed into vapor tank 48 through line 51. The gas is removed from the vapor tank through line 52 which communicates with tee 56. Feed line 47 communicates with the tee and with the inlet 46 of carbon sorber unit 45. Feed gas passes through lines 52 and 47 to the inlet 46 of the sorber unit 45 and then into contact with an activated carbon bed 41 contained in the carbon sorber unit. This gas passes from the bed as stripped exit gas through the sorber outlet 44 and out exit line 54 communicating with the outlet. The stripped gas is vented to the atmosphere. This apparatus differs from the previous two units in that the first check valve 42 is disposed in feed line 47 on the inlet side of the carbon sorber unit 45. However, as in the other embodiments, the check valve is disposed so that flow of feed gas can proceed from the inlet to the exit of the carbon sorber unit, as is shown by the arrow, but not in an opposite direction. Communicating with the tee where feed lines 52 and 47 are connected is conduit bleed line 53, this line being open to the atmosphere. A second check valve 43 is disposed in bleed line 53, so that flow of air from the atmosphere can pass through the bleed line and balance out any subambient pressure development on the inlet side of carbon sorber unit 45; i.e., in the feed lines and vapor tank. Flow of feed gas through the bleed line to the atmosphere is prohibited by the second check valve. The arrow indicates the direction of flow of gas through the bleed line. In operation, atmospheric air can bleed into the carbon sorber unit through exit conduit line 54 as the pressure at the inlet 46 and vapor tank 48 decreases below atmospheric pressure. However, there appears to be little contamination of the carbon bed in this type of apparatus even though the bed is exposed to ambient air. It is believed contamination is minimized because the volume of air capable of flowing through the carbon sorber unit is limited because as subambient pressure develops, atmospheric air flows through the first check valve 42, balancing the driving force.

A second aspect of the invention is a unitary fitting adapted for attachment to a carbon sorption unit for achieving reduced contamination of activated carbon therein.

Figure 3:
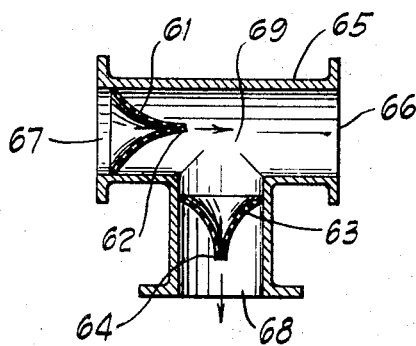
FIGS. 3 and 4 are cross-sectional views of unitary fittings with a first and a second check valve mounted therein in appropriate alignment for interconnecting a carbon sorber to a vapor feed supply line therefor.

The fitting shown in FIG. 3 is unitary, in the conformation of a pipe tee. It is adapted particularly to be connected directly to the laden vapor inlet of a cartridge-style sorber unit containing particulate activated carbon using conventional connecting means such as nuts, bolts, couplings, screw threads, or the like. The fitting comprises housing 65 enclosing passageway 69 and having three ports, specifically items 66, 67, and 68. Port 66 is adapted for connection to a vapor-laden feed gas supply line not shown. Laden gas that enters port 66 under slight superatmospheric pressure passes downwardly through a first check valve 63, then exhausts from housing 65 through port 68 (which is adapted for direct connection to the laden feed gas inlet of a carbon sorber unit, not shown). First check valve 63 is made of flexible, rubber-like plastic and has tip 64 which operates to stay closed at rest or in response to gas driving pressure differential from below, but to open in response to very low gas driving pressure differential from above. Valve 63 is sealed to the inner wall of housing 65 at the end opposite the tip. The laden feed gas at superatmospheric pressure upstream of valve 63 causes tip 64 to open and laden feed gas to exhaust therethrough. When the pressure on such laden feed gas declines to just slightly above atmospheric, tip 64 closes to halt such flow.

A second and like check valve 61 having tip 62 is mounted in housing 65 to block flow of laden feed gas out port 67 in bypass of the sorber unit. When slight subatmospheric pressure develops in passageway 69, said second check valve 61 is forced open by atmospheric air entering port 67 while said first check valve 63 closes to preclude air passage through port 68 (and thus through the cartridge of activated carbon).

Indicia for proper installation or even more positive, foolproof means for proper installation can be marked onto or actually built into the connecting means for ports 66 and 68 (e.g., unique spacing of bolt holes or unique threading) to attach to gas supply line and carbon cartridge, respectively.

Figure 4:
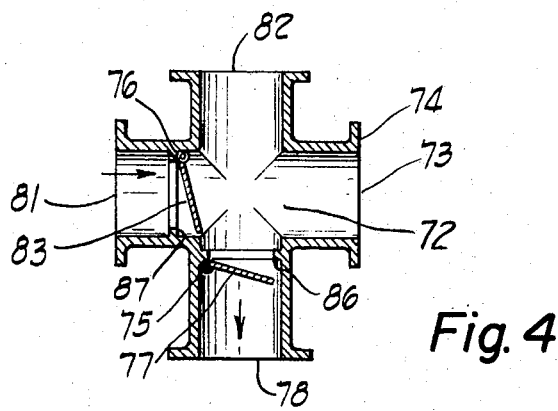

FIG. 4 is a cross-sectional view of another embodiment of a unitary fitting having the conformation of a pipe cross. The fitting comprises housing 74 of cross-shaped conformation enclosing gas passageway 72 and having four ports, specifically, items 73, 78, 81, and 82. Port 78 is adapted to connect to the laden gas inlet of a carbon cartridge sorter unit (not shown) and port 73 is adapted to connect to a line for laden feed gas supply (not shown). A first swing check valve, indicated by flapper 77 mounted to pivot on hinge 75 and close against seat 86, permits laden feed gas to flow out port 78 and into the carbon cartridge unit, but blocks atmospheric gas flow from coming through such sorber unit from the opposite direction. A second and similar swing check valve (indicated by flapper 83 mounted to pivot on hinge 76 and close against seat 87 is mounted to the right of port 81 to admit atmospheric air in bypass of the carbon sorber unit when subatmospheric pressure begins to manifest itself in passageway 72. The flappers of both these check valves are lightly spring loaded (by means not shown) to stay closed until pressure in the proper direction against them exceeds about an inch of water. Port 82 is adapted for connection to pressure relief means such as a rupture disc, manometer, or pressure relief valve. Thus, if overload of the fitting or a check valve failure by sticking closed occurs for any reason in operation, the equipment to which the fitting is connected still can be protected from possible over prssure or under pressure.

In addition to being compact and convenient, the unitary fitting is desirable for obtaining proper installation and avoiding costly wrong installation which can cause collapse of the tank or other substantial damage and danger.

The unitary fitting can be made of metal such as steel, stainless steel, aluminum, or brass. It also can be constructed of plastic where necessary or desirable, e.g., a polyolefin, a cellulose ester, a polyamide, or even a fiber-reinforced plastic such as a glass fiber reinforced thermosetting polyester or filled phenolic resin, or the like.

I claim:

1. A unitary fitting for a feed line through which vapor-laden gas is supplied intermittently to an activated carbon sorber, said fitting comprising:

a housing enclosing a passageway and having at least three ports connected thereto, one port being an inlet for said vapor-laden gas and having means for connecting it to said feed line,
a second port being an exhaust for said vapor-laden gas from said housing to the sorber and having means for connecting it to the inlet of said sorber, and
a third port being an inlet for atmospheric air,
a pair of check valves mounted in said housing,
a first check valve disposed for discharging said vapor-laden gas through said second port, and
a second check valve disposed for accepting atmospheric air flow through said third port.

2. The unitary fitting of claim 1 wherein the sorber is of the cartridge type.

3. The unitary fitting of claim 1 wherein said check valves are of the spring loaded type.

4. The unitary fitting of claim 5 wherein the passageway in said housing is connected to four ports, one of which is adapted for connection to pressure relief means.

* * * * *